Dec. 9, 1969　　　　　H. H. WALKER　　　　3,483,390
DIFFUSE LIGHT BAFFLE FOR INSPECTION OF CONTAINER TOPS
Filed Oct. 11, 1966　　　　　　　　　　3 Sheets-Sheet 1

INVENTOR.
HARRIS H. WALKER

BY
Strauch, Nolan, Neale,
Nies & Bronaugh
ATTORNEYS

Dec. 9, 1969  H. H. WALKER  3,483,390
DIFFUSE LIGHT BAFFLE FOR INSPECTION OF CONTAINER TOPS
Filed Oct. 11, 1966  3 Sheets-Sheet 2

INVENTOR.
HARRIS H. WALKER
BY
Strauch, Nolan, Neale,
Nies & Bronaugh
ATTORNEYS

Dec. 9, 1969   H. H. WALKER   3,483,390
DIFFUSE LIGHT BAFFLE FOR INSPECTION OF CONTAINER TOPS
Filed Oct. 11, 1966   3 Sheets-Sheet 3
FIG. 9
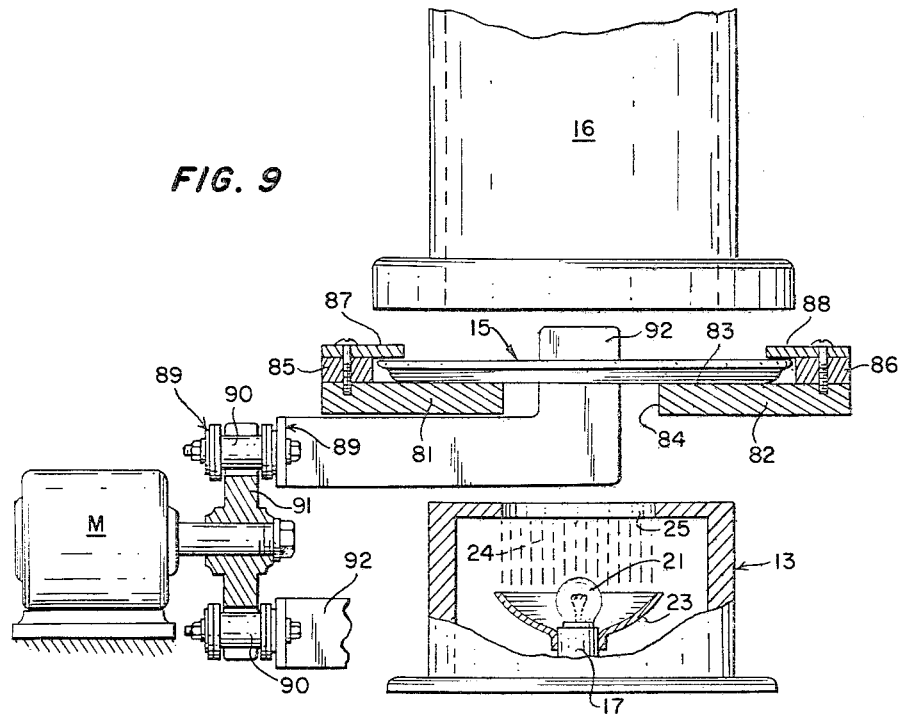
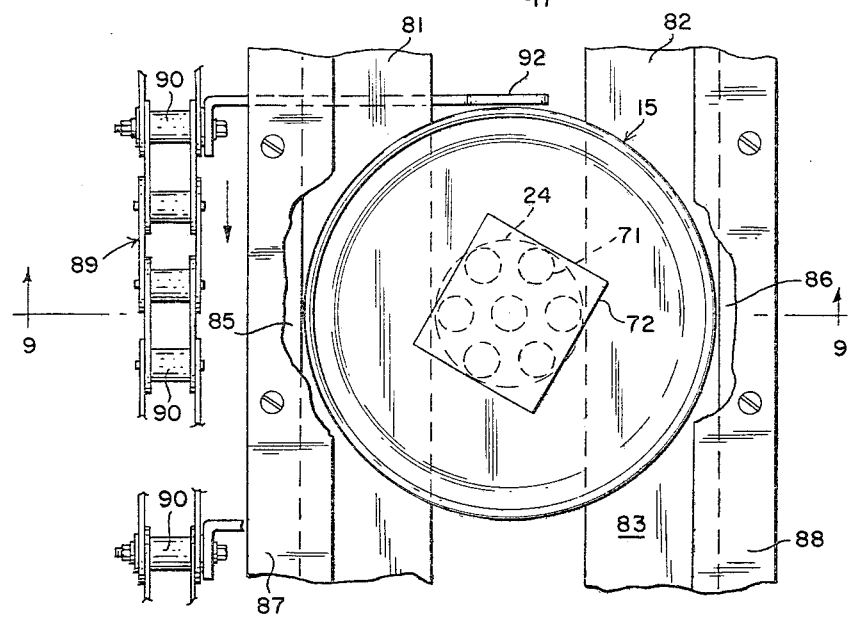
FIG. 8
INVENTOR.
HARRIS H. WALKER
BY
Strauch, Nolan, Neale,
Nies & Bronaugh
ATTORNEYS

United States Patent Office 3,483,390
Patented Dec. 9, 1969

3,483,390
DIFFUSE LIGHT BAFFLE FOR INSPECTION OF CONTAINER TOPS
Harris H. Walker, Baldwin, N.Y., assignor to Colgate-Palmolive Company, New York, N.Y., a corporation of Delaware
Filed Oct. 11, 1966, Ser. No. 585,973
Int. Cl. H01j *39/12*
U.S. Cl. 250—222    14 Claims

ABSTRACT OF THE DISCLOSURE

Apparatus for detecting the presence of uncovered apertures in an opaque container closure having a removable light transluscent cover over such apertures comprises means for directing a beam of light intercepted by said member toward light sensitive means, and baffle means in the path of the light for intercepting of the light diffused by passage through said cover while transmitting all light passing directly through any uncovered aperture to said light sensitive means.

---

This invention relates to a method and apparatus for detecting whether the dispensing apertures of a container top are covered and more particularly to an optical testing arrangement for the purpose.

In packaging dry granulated or powdered material such as cleansing powder the material is dipsosed within a stiff tubular fiberboard container closed and sealed at opposite ends by sheet metal discs suitably formed around their peripheries to clench on to the softer body wall. The disc representing the top of the container is formed as by punching with a group of dispensing openings usually symmetrically arranged in the center. For example, for one such container the three inch diameter top closure disc has a central aperture surrounded uniformly by six equally spaced apertures of the same size, about $3/16''$ diameter, all lying in an area about $7/8''$ in diameter.

This apertured area is covered by a strip of thin adhesive tape applied on the upper side of the disc of sufficient area to normally adequately cover the apertured closure area and close all the apertures, this cover strip being for example about one inch square for the above container. The strip is easily peeled off to dispense the contents, and may be replaced to close the apertures.

These tape covers are usually applied to the top closure discs rather swiftly by automatic machinery before the discs are incorporated into the container, and while such machinery is satisfactory when operating in proper adjustment there are times when the applied strip is not in proper registry with the aperture area and one or more of the outer apertures are not fully covered. Sometimes this failure of the strip to cover the apertures is so slight that visual inspection does not detect it. When filled containers with inadequately covered apertures are placed in a carton and shaken around during shipment considerable leakage of the gritty material occurs that is usually not discovered until arrival at the retail store, and shipments are returned.

Visual examination is not sufficient, for the fine powder will sift through even very small uncovered aperture areas; and it is the purpose of this invention to provide an optical testing device that will detect even the slightest failure of the adhesive cover strip to cover all dispensing apertures.

It is an object of the invention to provide a novel optical method and apparatus for detecting inadequate coverage of an aperture by a transluscent cover wherein discrimination is made between diffused light transmitted through the cover and direct light transmitted through an uncovered aperture area.

It is therefore the major object of this invention to provide a novel method of and apparatus for optical testing of container closures to detect small leak apertures.

Another object of the invention is to provide a novel photoelectric testing device for determining the presence of uncovered dispensing apertures in a container closure.

A further object of the invention is to provide a novel photoelectric testing device for detecting the presence of uncovered dispensing aperture areas in a container closure wherein the apertures are covered by a transluscent light diffusing cover, such as thin adhesive tape, wherein diffused light is intercepted by a baffle arrangement that permits passage of light transmitted through any uncovered aperture areas.

Another object of the invention is to provide a novel photoelectric testing device for detecting uncovered aperture areas in a container closure wherein the apertures are covered by a transluscent light diffusing cover wherein parallel light is directed through the closure and substantially only light passing directly through any uncovered aperture area is directed onto the photocell.

Further objects of the invention will appear as the description proceeds in connection with the appended claims and the annexed drawings wherein:

FIGURE 8 is a fragmentary top plan view showing an arrangement for feeding lids through the test apparatus; and FIGURE 9 is section on line 9—9 of FIGURE 8 showing structural details of the feeding means.

Figure 2:
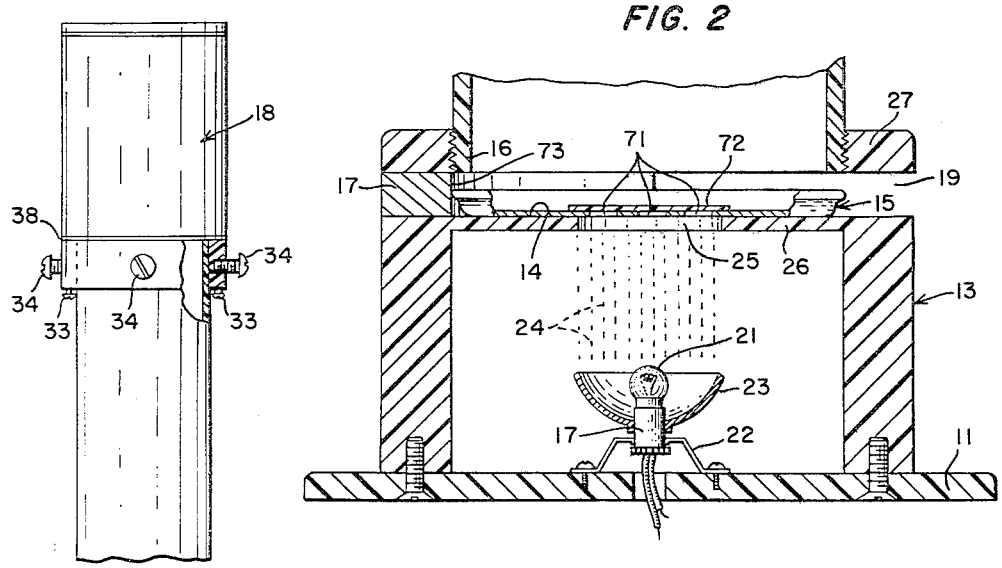
FIGURE 2 is an enlarged elevation in section showing the light source and test table structure.

Test test apparatus comprises a base 11 adapted to rest on any horizontal surface indicated at 12, a lower housing 13 for enclosing a source of light as shown in FIGURE 2 and having on its upper part the generally horizontal test table surface indicated at 14. The container lid to be tested is shown at 15 resting on the surface 14. Above the test table a hollow vertical tube 16 is fixed as through spacer member 17 to housing 13, and tube 16 carries on its upper end the detector assembly 18 best shown in FIGURE 3.

The closure to be tested is inserted laterally into the space 19 between the test table surface and the lower end of the detector assembly tube 16.

With reference to FIGURE 2 the housing 13 encloses an electric lamp 21 mounted on a support 22 at the focal point of a parabolic reflector 23 adapted to direct a relatively uniform cross section light beam 24 vertically upwardly through the circular aperture 25 in test table 26.

Spacer 17 is suitably fixed to table 26, and the lower end of tube 16 carries a collar 27 that is suitably fixed to spacer 17, so that tube 16 extends upwardly vertically concentric with table aperture 25.

Figure 3:
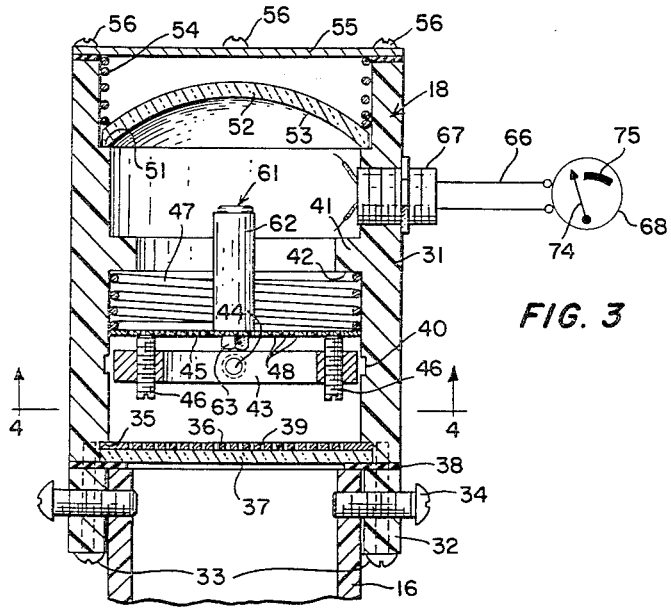
FIGURE 3 is an enlarged elevation in section showing details of the detecting assembly.
Figure 5:
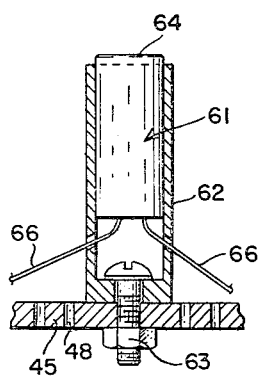
FIGURE 5 is a fragmentary view partly in section showing support of the photocell on one of the perforated baffle plates.
Figure 4:
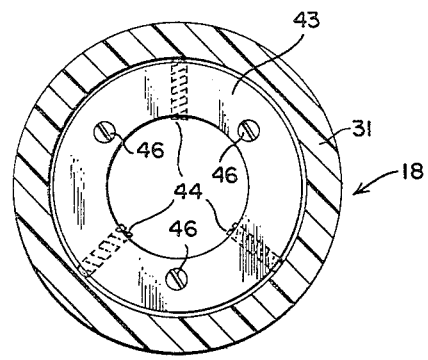
FIGURE 4 is a section approximately on line 4—4 of FIGURE 3 showing the adjustable photocell mounting.

Referring now to FIGURE 3, detector assembly 18 comprises a hollow housing 31 having a separable annular mounting collar 32 secured thereon as by screws 33. Collar 32 telescopes over the upper end of tube 16 and is secured thereon as by a series of radial screws 34.

Figure 6:
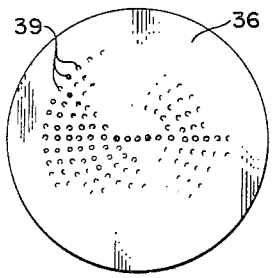
FIGURE 6 is a top plan view of a perforated baffle plate.

At its open lower end housing 31 is recessed at 35 to seat an apertured baffle plate 36 and below it a flat transparent plate 37 of glass or plastic. A suitable annular gasket 38 is provided between collar 32 and the housing, and when screws 33 are drawn tight baffle plate 36 and transparent plate 37 are rigidly secured in dust tight relaton across the housing 31, at right angles to the housing axis. FIGURE 6 shows baffle plate 36 in plan view. Baffle 36 is an opaque metal or plastic plate having a multiplicity of small closely spaced apertures 39. In some embodiments the separate opaque baffle plate may be replaced by an opaque coating on the upper side of transparent plate 37 with the baffle apertures comprising removed spots of coating. Apertures 39 are about one-thirty second of an inch in diameter and spaced apart about one diameter in this form of the invention.

Housing 31 has an internal annular flange 41 having a downwardly facing axial surface 42. Below the flange a transverse ring 43 is rigidly mounted within the housing. Ring 43 is of smaller diameter than the interior of housing 31, and a series of radial screws 44 threaded in the ring 43 extend into a shallow recess 40 in the housing wall for fixedly mounting the ring on the housing.

Above ring 43 a second apertured baffle plate 45 extends across the housing, and plate 45 is supported from below by three or more vertically adjustable screws 46 threaded in ring 43. A coiled compression spring 47 reacting between flange surface 42 and the outer periphery of baffle plate 45 urges baffle plate 45 against screws 46. Plate 45 is similar to plate 36 and is formed with $\frac{1}{32}''$ diameter apertures 48 that are the same in number, size and distribution as apertures 39, so that in the assembly apertures 39 are vertically axially aligned with apertures 48. Plate 45 can be tilted in any direction by adjustment of screws 46, providing a vernier adjustment during assembly that accurately positions the cell 61 at the focal point of reflector 52.

Above flange 41 housing 31 is formed with an axially upwardly facing annular shoulder 51 on which is seated a reflector 52 having a downwardly concave parabolic surface 53. Reflector 52 is held on shoulder 51 by a coilspring 54 compressed between the reflector and the top end cover 55 secured on housing 31 by screws 56.

A light sensitive photoelectric cell unit 61 is contained in a tubular mount 62 that is fixed as by the nut and bolt assembly 63 to the exact center of baffle plate 45, so that the eye or light admitting section 64 of the cell is located at the focal point of reflector surface 53. By adjustment of screws 46, the photocell eye can be accurately positioned relative to the reflector during calibration. Once this adjustment is made, it is enclosed and protected within housing 31, which also is moisture and dust tight.

Leads 66 from the photocell extend through a conduit fitting 67 to a meter indicated at 68.

In the assembly lamp 21, reflector 23, test table opening 25 and reflector 52 are all accurately centered on the same axis. Lamp 21 is at the focal point of reflector 23 to provide the parallel ray test beam 24 which preferably fills aperture 25 of the test table, and photocell 61 is located in the focal plane of reflector surface 53 so that all parallel ray light reflected from surface 53 will be directed toward the photocell eye 64.

Figure 7:
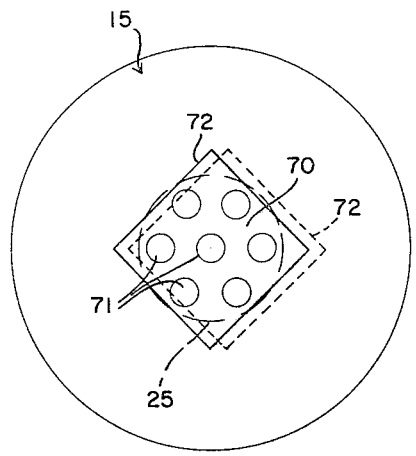
FIGURE 7 is a plan view of the container cap being tested showing the aperture cover in two positions for explaining the invention.
Figure 1:
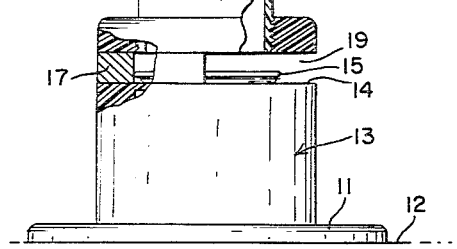
FIGURE 1 is an elevational view partly broken away and in section illustrating the invention according to a preferred embodiment.

FIGURES 1 and 2 show an article 15 to be tested according to the primary purpose of the invention resting on table surface 14, and FIGURE 7 is a plan view of that article.

Article 15 is the circular opaque metal top of a container for dry powdered or granulated cleansing material. This closure at its central portion 70 is preformed with a group of dispenser apertures 71 normally closed by a readily removable cover 72 in the form of a strip of relatively thin adhesive tape shown in full lines. An improperly applied cover 72 is shown in dotted lines in FIGURE 7, leaving the edge of one aperture 71 uncovered and open.

The cross sectional diameter of light beam 24 is usually such as to fill opening 25 with light flux, here about one inch in diameter, opening 25 being usually suitably larger in diameter than the apertured central area of the container closure 15. When closure 15 is pushed into the space 19 until it abuts spacer 17, its apertured central area 70 coextensively overlies opening 25. The inner face 73 of spacer 17 therefore comprises means for automatically centering the article over aperture 25.

One of the problems encountered in both visual and optical testing of these closure assemblies has been that a relatively powerful light beam is required to detect small uncovered aperture areas, and since the tape covers 72 are fairly thin they are transluscent and transmit diffused light at all of the apertures so that it is difficult if not impossible to detect or evaluate any difference in brightness that would signal an uncovered aperture portion.

The invention solves this problem of effectively discriminating between the diffused light transmitted by the tape and direct light transmitted through any uncovered aperture area, and this is chiefly accomplished by aligned aperture baffle arrangement consisting of spaced baffle plates 36 and 45 which intercept and block passage of most of the diffused light but permit any direct light of beam 24 that has passed through an uncovered aperture area to pass straight through aligned baffle apertures 39 and 48 to be collected by reflector surface 53 and directed onto the photoelectric cell. In the arrangement shown about eighty percent of the diffused light transmitted by the cover 72 is blocked. It will be noted that photocell 61 will block light transmitted through the center of plate 45 but that does not affect the efficiency of the device because invariably it is only the outer edges of the outer apertures 71 which may be uncovered. The diameter of cell mount 62 is less than half the diameter of closure area 70.

As shown the cell 61 may be connected electrically to meter 68 wherein a pointer 74 is moved over a marked signal area 75 whenever excess transmitted light has activated the cell. Usually the device is calibrated to compensate for stray light, and only light transmitted through the closure under test operates the detector assembly.

Any suitable number of perforated baffle plates may be employed, with their perforations axially aligned. For some operations only one baffle plate may be needed to secure the required baffling of diffused light.

The housing 13 and 31 and tube 16 may be opaque plastic parts cut or otherwise formed to shape, so that construction is simple and inexpensive. The baffle plates 36 and 45 are usually perforated metal disks painted black to eliminate reflected light. Axial alignment of the perforations in the baffle plates, when more than one baffle is used, is set before housing 31 is closed, and thereafter this relationship is protected from change.

Instead of using reflector 23 the test beam could be collimated by a condenser lens above the light source within housing 13.

FIGURES 8 and 9 illustrates the invention as embodied in a machine wherein the lids to be tested are automatically handled, a series of lids in succession being brought in on an endless conveyor belt to pass in alignment with the light beam for detection of any leakage. In practice adequate scanning is possible for lids continuously moving up to 400 feet per minute.

In this embodiment tube 16 is fixedly mounted in vertical position and contains the detector assembly 18 as in FIGURE 1. Similarly, a source of parallel light 13 is located therebelow to provide a parallel light beam indicated at 24 in FIGURE 8.

The test table here comprises a pair of laterally spaced members 81 and 82 having a top surface lying in a plane 83 and separated by a longitudinal opening 84 that is preferably at least as wide as the light beam diameter. Mounted on members 81 and 82 are parallel lid edge guides 85 and 86, and fixed parallel retainer guide members 87 and 88 project slightly inwardly over surface plane 83.

An endless conveyor belt 89 has a series of rollers 90 for driving engagement with a sprocket 91 driven by a motor M.

Belt 89 carries a series of fingers 92 that are upright as the horizontal top flight of the belt moves through the table and project through opening 84. Fingers 92 are suitably spaced along belt 89 and each finger pushes a lid along the guide members 81 and 82 as shown in FIGURE 8.

In practice taped lids 15 in succession are deposited upon the top flight of conveyor 15 between successive fingers 92 at one end of the table. Operation of the motor M moves the belt to pass each lid in centered relation through light beam 24. At this time, the opposite sides of the lid are slidably resting on surface 83, the edge guides 85 and 86 constraining the lid laterally, and top guides 87 and 88 restraining the lid vertically.

The foregoing thus provides automatic feeding of the lids to be tested into the testing unit which operates otherwise as disclosed in FIGURES 1–7. The tested lids emerge at the exit side of the test table, and are removed. In this embodiment an audible alarm is preferably provided to be actuated by pointer 74, so that the test device equipped with automatic lid feeding and discharging means can operate automatically without any attention until the alarm sounds.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patents is:

1. In a method of detecting uncovered apertures in a container closure consisting essentially of an opaque member having an area formed with dispensing apertures overlaid with a removable cover that is substantially transluscent, the step of passing a directional beam of light to be intercepted by said member, said light beam being of a cross section at least equal to said area, and detecting any light transmitted directly through an open or only partially covered aperture while intercepting at least most of the light diffused by passage through said cover.

2. In the method defined in claim 1, said beam being parallel light.

3. Apparatus for detecting the presence of uncovered apertures in an opaque container closure member having a removable light transluscent cover overlying an area of said member formed with said apertures comprising means for directing a beam of light to be intercepted by said member, said light beam being of a cross section at least equal to said area, light sensitive means and means including baffle means in the path of said light for intercepting at least most of the light diffused by passage through said cover while transmitting any light passing directly through an uncovered aperture or part thereof in said member to said light sensitive means.

4. In the apparatus defined in claim 3, means for collimating said light to project a beam of parallel light toward said member.

5. In the apparatus defined in claim 3, said baffle means comprising a perforated screen disposed between said member and the light sensitive means.

6. In the apparatus defined in claim 3, said baffle means comprising at least two spaced parallel perforated screens having axially aligned openings and disposed between said member and the light sensitive means.

7. In the apparatus defined in claim 3, reflector means for collecting said directly transmitted light and directing it into said light sensitive means.

8. In the apparatus defined in claim 7, said reflector means being a parabolic reflector at the focus of which is disposed said light sensitive means.

9. In the apparatus defined in claim 3, means providing a lower housing enclosing the light beam directing means, means providing an upper housing enclosing said baffle means and the light sensitive means, said baffle means being an apertured plate extending across said upper housing to prevent passage of diffused light to said light sensitive means, and means defining an apertured support surface between said housings for locating said member in test position in the path of said light beam.

10. In the apparatus defined in claim 9, means mounting the light sensitive means on said plate.

11. In the apparatus defined in claim 10 a light collecting reflector within said upper housing for receiving said direct light, and means for adjusting said plate for locating the light sensitive means in the focus of said reflector.

12. In the apparatus defined in claim 11, there being two transverse baffle plates vertically spaced in said upper housing, with their apertures in axial alignment, with the uppermost of said plates being adjustable and carrying said light sensitive means.

13. Apparatus for detecting the presence of uncovered apertures in opaque container closure member each having an area formed with said apertures and overlaid with a light transluscent cover for said apertures comprising means defining a generally horizontal support surface for receiving said members, said surface having an opening, means for projecting a test light beam through said opening, said light beam having a cross section at least equal to said area, means for automatically feeding a succession of said members having such covers along said surface through said beam, light sensitive means above said surface and means including baffle means interposed between the closure member in the light path and said light sensitive means for intercepting at least most of the light diffused by passage through said cover while transmitting any light passing directly through an uncovered aperture or part thereof in said member to said light sensitive means.

14. The apparatus defined in claim 13, wherein said means for feeding said members along said surface comprises an endless conveyor having a horizontal flight carrying a spaced succession of fingers moving through said opening, said fingers being spaced apart for engaging successive members to be tested.

References Cited

UNITED STATES PATENTS

| 2,070,339 | 2/1937 | Moore | 250—223 X |
|---|---|---|---|
| 2,472,945 | 6/1949 | Gingrich. | |
| 2,742,151 | 4/1956 | Milford | 250—222 X |
| 2,916,624 | 12/1959 | Angel et al. | |
| 3,218,463 | 11/1965 | Calhoun | 250—222 |
| 3,248,554 | 4/1966 | Chen. | |

OTHER REFERENCES

Goldbach et al., IBM Technical Disclosure, vol. 6, No. 6, November 1963, p. 74.

Dryjanski et al., IBM Technical Disclosure, vol. 7, No. 7, December 1964, pp. 614–15.

RALPH G. NILSON, Primary Examiner

C. M. LEEDOM, Assistant Examiner

U.S. Cl. X.R.

209—111.7; 356—200, 240